United States Patent
Velthaus et al.

(10) Patent No.: US 9,835,927 B2
(45) Date of Patent: Dec. 5, 2017

(54) ELECTRO-OPTICAL MODULATOR DEVICES

(71) Applicant: FRAUNHOFER-GESELLSCHAFT ZUR FÖRDERUNG DER ANGEWANDTEN FORSCHUNG E.V., München (DE)

(72) Inventors: Karl-Otto Velthaus, Kleinmachnow (DE); Marko Rausch, Berlin (DE); Jung Han Choi, Berlin (DE); Lei Yan, Berlin (DE)

(73) Assignee: FRAUNHOFER-GESELLSCHAFT ZUR FÖRDERUNG DER ANGEWANDTEN FORSCHUNG E.V., München (DE)

( * ) Notice: Subject to any disclaimer, the term of this patent is extended or adjusted under 35 U.S.C. 154(b) by 0 days.

(21) Appl. No.: 15/039,404

(22) PCT Filed: Nov. 25, 2014

(86) PCT No.: PCT/EP2014/075526
§ 371 (c)(1),
(2) Date: May 25, 2016

(87) PCT Pub. No.: WO2015/075258
PCT Pub. Date: May 28, 2015

(65) Prior Publication Data
US 2016/0363834 A1  Dec. 15, 2016

(30) Foreign Application Priority Data
Nov. 25, 2014 (EP) .................................. 13194262.5

(51) Int. Cl.
*G02F 1/225* (2006.01)
*G02F 1/21* (2006.01)

(52) U.S. Cl.
CPC ...... *G02F 1/2255* (2013.01); *G02F 2001/212* (2013.01); *G02F 2201/127* (2013.01)

(58) Field of Classification Search
CPC ............. G02F 1/2255; G02F 2001/212; G02F 2201/127
See application file for complete search history.

(56) References Cited

U.S. PATENT DOCUMENTS 7,986,020 B2   7/2011 Kagaya
9,316,887 B2 *  4/2016 Sugiyama ............. G02F 1/2255
(Continued)

FOREIGN PATENT DOCUMENTS

EP    2 230 713 A1   9/2010
EP    2 615 489 A1   7/2013
(Continued)

OTHER PUBLICATIONS

Bogatin, E., "Differential Impedance . . . finally made simple," Training for Signal Integrity and Interconnect Design, 2000, pp. 1-25.
Burkard, H., "HiCoFlex—an ultra-thin, highly flexible Multilayer," Technology & Production—Processes for Flexible Electronic Systems, 3rd International Workshop, Dec. 2, 2004, pp. 2-32.
(Continued)

*Primary Examiner* — Jerry Rahll
(74) *Attorney, Agent, or Firm* — Maschoff Brennan

(57) ABSTRACT

An electro-optical modulator device is provided. The electro-optical modulator device comprises at least one electro-optical modulator having a first and a second optical waveguide and an electrode arrangement for applying a voltage across the optical waveguide, wherein the electrode arrangement comprises a plurality of first waveguide electrodes and a plurality of second waveguide electrodes arranged on top of the first and the second optical waveguide, respectively, wherein the first and second waveguide electrodes are capacitively coupled to one another; and at least one driver unit for supplying a voltage to the electrode arrangement;
(Continued)

and an electrical connection between the driver unit and the electrode arrangement. The electrical connection between the driver unit and the electrode arrangement comprises a flexible coplanar strip line.

17 Claims, 15 Drawing Sheets

(56) References Cited

U.S. PATENT DOCUMENTS

| | | | |
|---|---|---|---|
| 2004/0001242 | A1 | 1/2004 | Shigeta et al. |
| 2007/0237444 | A1 | 10/2007 | Keil |
| 2008/0089634 | A1 | 4/2008 | Mosinskis et al. |
| 2012/0114340 | A1 | 5/2012 | Sugiyama |
| 2013/0209023 | A1 | 8/2013 | Prosyk |

FOREIGN PATENT DOCUMENTS

| | | |
|---|---|---|
| EP | 2 615 490 A1 | 7/2013 |
| JP | 2007-012717 A | 1/2007 |
| WO | 2012/175551 A1 | 12/2012 |
| WO | 2013/096750 A1 | 6/2013 |

OTHER PUBLICATIONS

Fach, A., et al., "Multilayer polyimide film substrates for interconnections in microsystems," Microsystem Technologies, vol. 5, Issue 4, Jul. 1999, pp. 166-168.
Hoffmann, D., et al., "45 GHZ Bandwith Travelling Wave Electrode Mach-zehnder Modulator with Integrated Spot Size Converter," Proceedings International Conference on Indium Phosphide and Related Materials, 2004, pp. 585-588.
Kato, T., et al., "10-Gb/s-80-km operation of full C-band InP MZ modulator with linear-accelerator-type tiny in-line centipede electrode structure directly driven by logic IC of 90-nm CMOS process," Optical Fiber Communication Conference and Exposition, 2011, pp. 1-3.
Simons, R.N., et al., "Modeling of coplanar stripline discontinuities," IEEE Transactions on Microwave Theory and Techniques, vol. 44, Issue 5, May 1996, pp. 711-716.
Walker, R. G., et al., "High-Speed III-V Semiconductor Intensity Modulators", IEEE Journal of Quantum Electronics, vol. 27, Issue 3, Mar. 1991, pp. 654-667.
Karpuz et al, "An investigation on resonance characteristics of cps openloop resonator" Microwave Conference, 2001. APMC 2001. 2001 Asiapacific; Dec. 3-6, 201. IEEE Piscataway, US, vol. 3 2001, pp. 1104-1108.

* cited by examiner

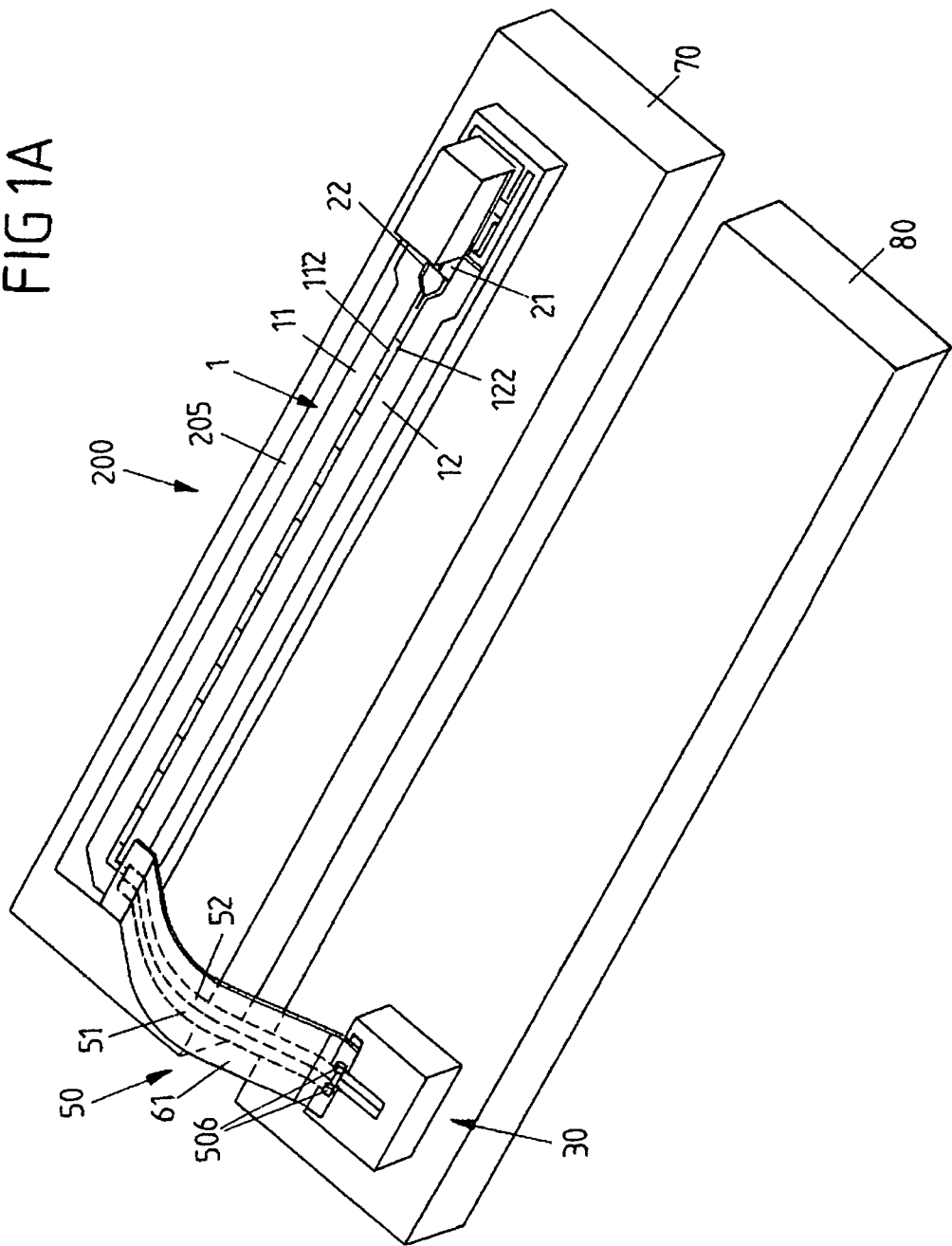

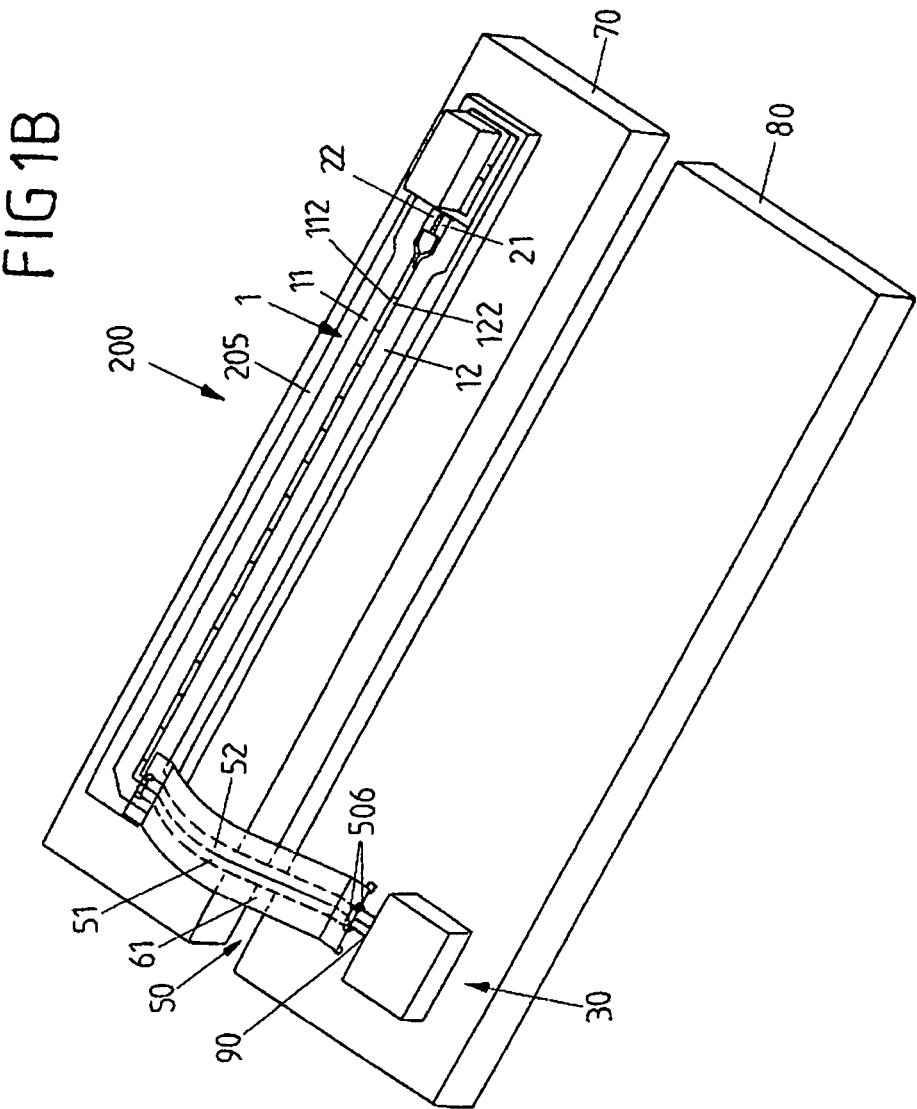

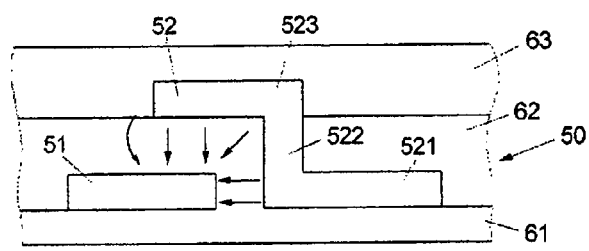
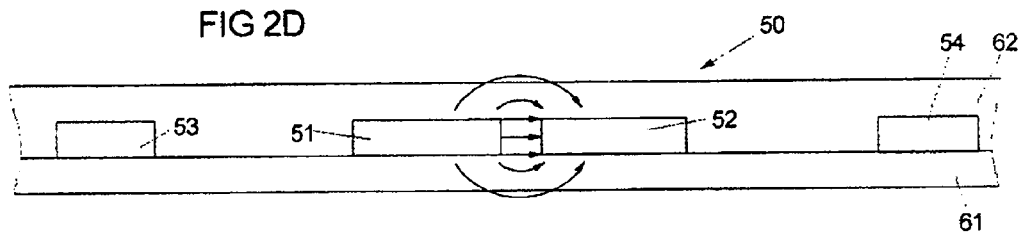

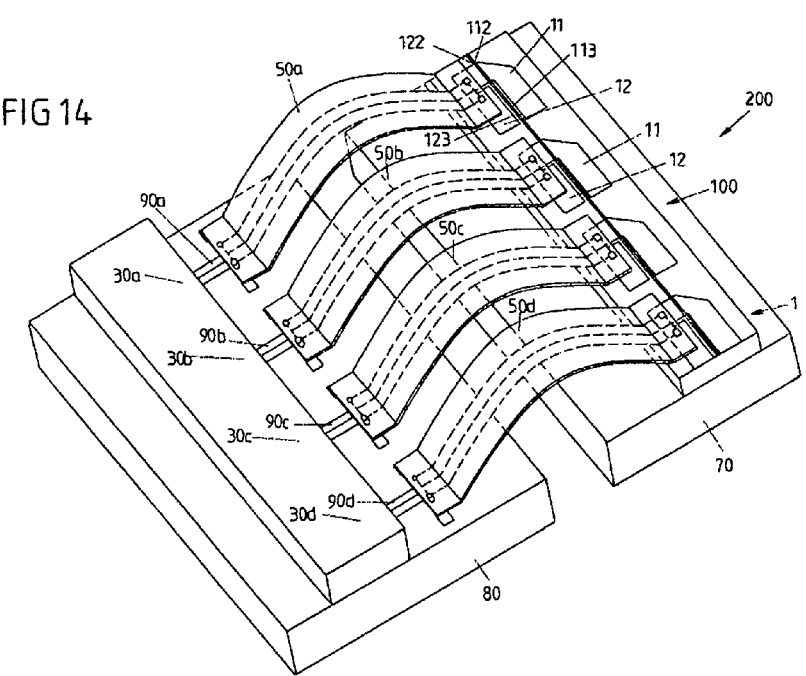

ELECTRO-OPTICAL MODULATOR DEVICES

CROSS-REFERENCE TO A RELATED APPLICATION

This application is a National Phase patent application of International Patent Application Number PCT/EP2014/075526, filed on Nov. 25, 2014, which claims priority of European Patent Application Number 13194262.5, filed on Nov. 25, 2013.

BACKGROUND

The invention relates to electro-optical modulator devices.

Such electro-optical modulator devices comprise, for example, a high frequency electrode arrangement used for supplying a voltage across the optical waveguides of the modulators for creating a phase shift of the optical waves propagating in the waveguides. For example, travelling wave electrodes are used for supplying a voltage to the optical modulator waveguides as disclosed in the publication "High-Speed III-V Semiconductor Intensity Modulators", Robert G. Walker, IEEE Journal of Quantum Electronics Vol. 27, No. 3, March 1991. Driver units are used to provide a voltage fed to the travelling wave electrodes, wherein the driver units are connected to the travelling wave electrodes via bonding wires. The inductance of the bonding wires, however, causes reflection of the high frequency electrical signal supplied to the travelling wave electrodes that may deteriorate the frequency response of the modulators.

SUMMARY

It is an object of the invention to improve the frequency response of electro-optical modulators.

According to the invention, an electro-optical modulator device is provided, comprising
- at least one electro-optical modulator having a first and a second optical waveguide and an electrode arrangement for applying a voltage across the optical waveguide,
- wherein the electrode arrangement comprises a plurality of first waveguide electrodes and a plurality of second waveguide electrodes arranged on top of the first and the second optical waveguide, respectively,
- wherein the first and second waveguide electrodes are capacitively coupled to one another; and
- at least one driver unit for supplying a voltage to the electrode arrangement; and
- an electrical connection between the driver unit and the electrode arrangement;
- wherein the electrical connection between the driver unit and the electrode arrangement comprises a flexible coplanar strip line wherein the electrode arrangement comprises a first electrical line connected to the first waveguide electrodes and a second electrical line connected to the second waveguide electrodes, the first and the second electrical line forming a coplanar strip line,
- wherein the electrical connection between the driver unit and the electrode arrangement comprises a flexible coplanar strip line,
- wherein the flexible coplanar strip line comprises at least two electrical lines,
- wherein a first one of the electrical lines of the flexible coplanar strip line is connected to the first electrical line of the electrode arrangement and a second one of the electrical lines of the flexible coplanar strip line is connected to the second electrical line of the electrode arrangement, and
- wherein the driver unit is configured for supplying a differential voltage signal to the coplanar strip line formed by the first and the second electrical line of the electrode arrangement via the first and the second electrical line of the flexible coplanar strip line.

It is noted that the electrical connection (i.e. an electrical link) between the driver unit and the electrode arrangement may at least essentially consist of the flexible coplanar strip line, wherein the driver unit is directly connected to the electrode arrangement via the flexible coplanar strip line. However, it is also conceivable that the flexible coplanar strip line only forms a segment of the electrical connection between the driver unit and the electrode arrangement such that the connection comprises at least one other section that is not formed by a flexible coplanar strip line. The flexible coplanar strip line in particular permits to be adapted (impedance matched) to the coplanar strip line of the electrode arrangement of the modulator, wherein the flexible coplanar strip line and the coplanar strip line of the modulator may form a homogeneous and impedance matched line having improved high frequency characteristics. In particular, the at least two electrical lines of the flexible coplanar strip line are arranged on at least one flexible layer, wherein the two lines are arranged in a distance from one another that permits the lines to act as an electrical waveguide for conveying a high frequency mode from the driver unit to the modulator. For example, the distance between the first and the second electrical line of the flexible coplanar strip line is less than 25 μm, less than 10 μm or less than 5 μm (e.g. 2, 3 or 4 μm). The flexible coplanar strip line may comprise exactly two electrical lines, wherein in particular none of the two electrical lines is grounded.

For example, modulator devices (i.e. the combination of the driver unit and the modulator), employed e.g. for long-distance applications, having power losses smaller than 400 mW may be realized. Further, because of the possible low power consumption and the possible compact design of the modulator, compact high frequency modulator modules (having e.g. a transmission rate of at least 100 Gbit/s) can be fabricated (e.g. in the CFP4 module size). Further, the thermal conductivity of the flexible coplanar strip line may be lower than those of conventional bonding wires. Thus, thermal crosstalk between the driver unit and the modulator may be lower. Further, the distance between the driver unit (e.g. in the form of an integrated circuit) and modulator may be larger, thereby facilitating the assembly of the modulator device. For example, the modulator can be disposed on a thermoelectric cooler while the driver unit is arranged on a housing part of the modulator device.

The electrical lines of the flexible coplanar strip line may be bonded, e.g. soldered or glued (using a conductive adhesive) or by means of a metal connection, to the electrical lines of the modulator's electrode arrangement.

The flexible coplanar strip line further may be formed employing thin film technology (that in particular permits the electrical lines of the flexible coplanar strip line to be produced with high precision). For example, the flexible coplanar strip line comprises two electrical lines arranged on at least one isolating layer, wherein the isolating layer may be formed from a polymer material such as polyimide, a liquid crystal polymer—LCP or Benzocyclobutene—BCB, wherein multiple polymer layers may be used. Examples of the principle fabrication of isolating layers for a flexible electrical line are described in the article "Multilayer polyimide film substrates for interconnections in microsystems", A. Fach, Y. Athanassov, U. Brunner, D. Hablutzel, B. Ketterer, J. Link, MicrosystemTechnologies 5 (1999) 166-168, which in respect of the preparation of the isolating layer(s) of the flexible coplanar strip line is incorporated by reference herewith.

For example, the at least one isolating layer may have a thickness of less than 50 µm, less than 25 µm or less than 15 µm. Further, the electrical lines of the flexible coplanar strip line may be fabricated using a lithographic process, wherein the electrical lines may be disposed on the flexible substrate by metal deposition (using e.g. electroplating, vapor deposition or sputtering). It is noted, however, that instead of thin polyimide layers the flexible coplanar line may comprise a (e.g. single) isolating (e.g. foil-like) thicker substrate.

In particular, other components of the modulator device may be connected by other flexible electrical lines (e.g. fabricated together with the flexible coplanar strip line). In particular, the driver unit (e.g. a driver IC) can be arranged on a flexible substrate together with the electrical lines of the flexible coplanar line and other wiring (e.g. using the flip-chip technology). Thus, a testable driver unit having integrated connections to and from the driver unit can be generated, the driver unit being easily and cost-efficiently integrable into a module.

For example, the coplanar strip line formed by the first and the second electrical line is operated as a travelling wave electrode, e.g. of a Mach-Zehnder modulator. Further, the first and the second electrical line is capacitively coupled to one another via the capacitively coupled first and second waveguide electrodes. For example the optical waveguides of the modulator each comprise a plurality of capacitive segments spaced apart from one another, the capacitive segments each forming an electrical capacitor. The first and second waveguide electrodes are arranged on top of the capacitive segments such that they are capacitively coupled to one another via the capacitive segments.

An example of a possible principal optical and electrical layout of such a travelling wave Mach-Zehnder modulator is described in the publication "45 GHz Bandwidth Travelling Wave Electrode Mach-Zehnder Modulator with Integrated Spot Size Converter", D. Hoffmann, Proceedings International Conference on Indium Phosphide and Related Materials, p. 585, 2004, wherein the content of this article in respect to the principle optical and electrical design of the Mach-Zehnder modulator is incorporated by reference herewith. It is noted, however, that the invention is of course not restricted to a particular electrode design but could be also used in other electrical circuits or to form other electrical circuits. Further, the another possible design is described in international patent application WO 2012/175551 which in respect to the principle optical and electrical design of modulator is also incorporated by reference herewith. For example, the modulator device comprises IQ modulators and/or OFDM modulator(s) (e.g. in the form of a PIC—photonic IC).

The first and a second electrical line is driven symmetrically ("differential drive"), i.e. the driver unit is configured for supplying a differential voltage signal to the flexible coplanar strip and thus to the coplanar strip line of the modulator. For example, none of the electrical lines of the electrode arrangement and/or of the flexible coplanar strip line is grounded, wherein the driver unit is configured for supplying a first varying signal to the first electrical line of the electrode arrangement via the first electrical line of the flexible coplanar strip line and a second varying signal to the second electrical line of the electrode arrangement via the second electrical line of the flexible coplanar strip line.

Further, the first and the second electrical line may be formed at least partially as geometrically symmetric structures. For example, the first and the second electrical line of the flexible coplanar strip line are formed as longitudinal structures which at least essentially extend parallel to one another.

The impedance of the driver unit at each one of its two output ports may be essentially half of the impedance of the electrode arrangement. Moreover, the driver unit may be configured in such a way that the first and the second varying signal supplied to the first and second electrical line, respectively, have opposite polarity (wherein the absolute voltage value of the first and the second varying signal may be at least essentially identical).

Examples of symmetrically driven electrodes are disclosed in the European patent applications EP 2 615 489 and EP 2 615 490 which in that respect are enclosed by reference herewith.

Further, the first and the second electrical line of the flexible coplanar strip line are e.g. arranged on a (e.g. flexible) isolating layer at least partially adjacent to one another in a direction perpendicular to their longitudinal extension. However, the first and the second electrical line of the flexible coplanar strip line may also be arranged at least partially one above the other in a direction perpendicular to the at least one isolating layer The first and/or the second line of the flexible coplanar strip line may be arranged on a first isolating layer (e.g. a first polyimide layer) and may be covered by a second isolating layer (e.g. a second polyimide layer). For example, a second isolating layer extends between a first portion and a second portion of the second electrical line. Moreover, two further lines may be arranged on the isolating layer, the further lines being grounded.

According to another embodiment of the invention, the driver unit is operated in open collector mode or in open collector mode with back termination. Similarly, the driver unit may be operated in open drain or in open drain mode with back termination (if the driver unit is a CMOS device).

More particularly, the driver unit (e.g. a driver chip), the flexible coplanar line, the first and the second electrical line, a terminating resistors and a (blocking) capacitive structure for galvanically separating the terminating resistors (and e.g. also the employed assembly and joining technology) can be regarded as integral components of the open collector circuitry (e.g. a high frequency open collector circuitry) as will be explained in more detail below. In particular, an immersive electrical design of the driver unit, flexible coplanar line, the electrical lines and a terminating network (comprising at least one terminating resistors as set forth below) of the modulator will be carried out in particular to adapt the overall impedance of these components and thus to optimize the performance of the modulator. It is noted that it is of course not necessary to use open collector circuitry. Rather, the driver unit may have an internal terminating resistance that equals the impedance of the electrode arrangement, wherein the impedance of the flexible coplanar line, the first and the second electrical line and other electrical components (such as the terminating resistor mentioned above) is matched to the internal terminating resistance of the driver unit.

As set forth above, the modulator may comprises at least one terminating resistor for terminating the coplanar strip line formed by the first and the second electrical line, wherein the terminating resistor may be (physically)

arranged between the first and the second electrical line of the electrode arrangement. For example, the terminating resistor is a single resistor (having a resistance of e.g. 50 Ohm), wherein the terminating resistor may be formed by a material layer (e.g. a thin film layer or a thin film layer packet). The terminating resistor may be monolithically integrated with the first and the second electrical line, i.e. it may be arranged on the same substrate as the first and the second electrical line. In that case only the driver unit will be connected to the first and the second electrical line of the modulator's electrode arrangement via a flexible coplanar strip line. However, the terminating resistor may also be formed as a separate component arranged e.g. on a different substrate (e.g. a ceramic substrate) than the electrical lines of the modulator and/or coupled to the first and the second electrical line of the modulator via a flexible coplanar strip line or e.g. via short bonding wires.

The modulator may also comprise two terminating resistors, wherein the two terminating resistors are connected to one another via an end contact. In particular, a first end of the first one of the terminating resistors is connected to the first electrical line and a second end is connected to the end contact. Similarly, a first end of the second terminating resistor is connected to the second electrical line and a second end is connected to the end contact. The two terminating resistors may be formed by material layers connected to one another by an end contact layer forming the end contact. It is also possible that the two terminating resistors are galvanically separated by connecting the terminating resistor to one another via a capacitor. Moreover, at least one capacitive structure may be provided that galvanically separates the two terminating resistors. For example, the capacitive structure comprises at least two electrically conductive layers arranged between the first and the second electrical line, wherein the at least two layers are separated by at least one dielectric layer.

The flexible coplanar strip line may further be part of a flexible contact structure that comprises a plurality of conducting lines for connecting external devices to input contacts of the driver unit.

According to another aspect of the invention, an electro-optical modulator device is provided, comprising
- at least one electro-optical modulator having a first and a second optical waveguide and an electrode arrangement for applying a voltage across the optical waveguide,
- wherein the electrode arrangement comprises a plurality of first waveguide electrodes and a plurality of second waveguide electrodes arranged on top of the first and the second optical waveguide, respectively,
- wherein the first and second waveguide electrodes are capacitively coupled to one another; and
- an electrical connection between the driver unit and the electrode arrangement; and
- a plurality of driver units, wherein each one of the driver units is connected to one of the first waveguide electrodes and to one of the second waveguide electrodes via an electrical connection that comprises a flexible coplanar strip line.

Thus, the waveguide electrodes can be driven individually (independent from one another) as described in the publication "10 Gb/s-80-km operation of full C-band InP MZ modulator with linear-accelerator-type tiny in-line centipede electrode structure directly driven by logic IC of 90-nm CMOS process", T. Kato et al., Optical Fiber Communication Conference and Exposition, 2011, p. 1, which in respect to the multiple driver arrangement is incorporated by reference herewith.

According to yet another aspect, the invention relates to an electro-optical modulator device, comprising
- at least one electro-optical phase modulator having at least one active optical waveguide and an electrode arrangement for applying a voltage across the active optical waveguide,
- wherein the electrode arrangement comprises a plurality of waveguide electrodes arranged on top of capacitive segments formed by the optical waveguide;
- at least one optically inactive capacitive element;
- at least one driver unit for supplying a voltage to the electrode arrangement;
- an electrical connection between the driver unit and the electrode arrangement, wherein the waveguide electrodes are capacitively coupled to the at least one driver unit via the capacitive segments and the capacitive element and the electrical connection, wherein
- the electrical connection between the at least one driver unit and the electrode arrangement comprises a flexible coplanar strip line.

A plurality of capacitive elements may be provided in the form of capacitive segments formed by a second waveguide that is optically inactive. On top of the second waveguide (second) waveguide electrodes may be provided such that the phase modulator is designed similarly to the travelling wave Mach-Zehnder modulator mentioned above, wherein, however, only one of the two optical waveguides is optically active and used for modulating the phase of an optical signal. In contrast to the Mach-Zehnder-modulator, however, the second, inactive waveguide and thus the second waveguide electrodes of the phase modulator may be broader than the active optical waveguide and the (first) waveguide electrodes on top of the optically active waveguide.

According to an alternative embodiment, the phase modulator device comprises a plurality of driver units, which permit the waveguide electrodes to be driven individually as described above.

However, it is noted the capacitive elements of the phase modulator device do not necessarily have to be formed by an (inactive) waveguide. Rather, in principle, any kind of capacitive structure may used that, in particular, is connected in series with the capacitive segments formed by the active optical waveguide.

According to yet another aspect, the invention relates to an electro-optical modulator device, in particular as described above, comprising
- at least one electro-optical modulator having at least one optical waveguide and an electrode arrangement for applying a voltage across the optical waveguide,
- wherein the electrode arrangement comprises a first and a second electrical line forming a coplanar strip line; and
- at least one terminating resistor terminating the first and a second electrical line; and
- an electrical connection between the terminating resistor and first and a second electrical line, wherein
- the electrical connection between the terminating resistor and the first and the second electrical line comprises a flexible coplanar strip line.

The first and the second electrical line in particular may be capacitively coupled to one another. For example, the electro-optical modulator is a Mach-Zehnder modulator or a phase modulator as described above.

BRIEF DESCRIPTION OF THE DRAWINGS

Embodiments of the invention are explained in more detail hereinafter with reference to the Drawings:

FIG. 1A shows a perspective view of an electro-optical modulator device according to an embodiment of the invention.

FIG. 1B relates to an alternative realization of the embodiment shown in FIG. 1A.

FIGS. 2A-2D illustrated different configurations of a flexible coplanar strip line.

FIG. 14 shows a perspective view of an alternative realization of the modulator device of FIG. 13.

DETAILED DESCRIPTION

Figure 1C:
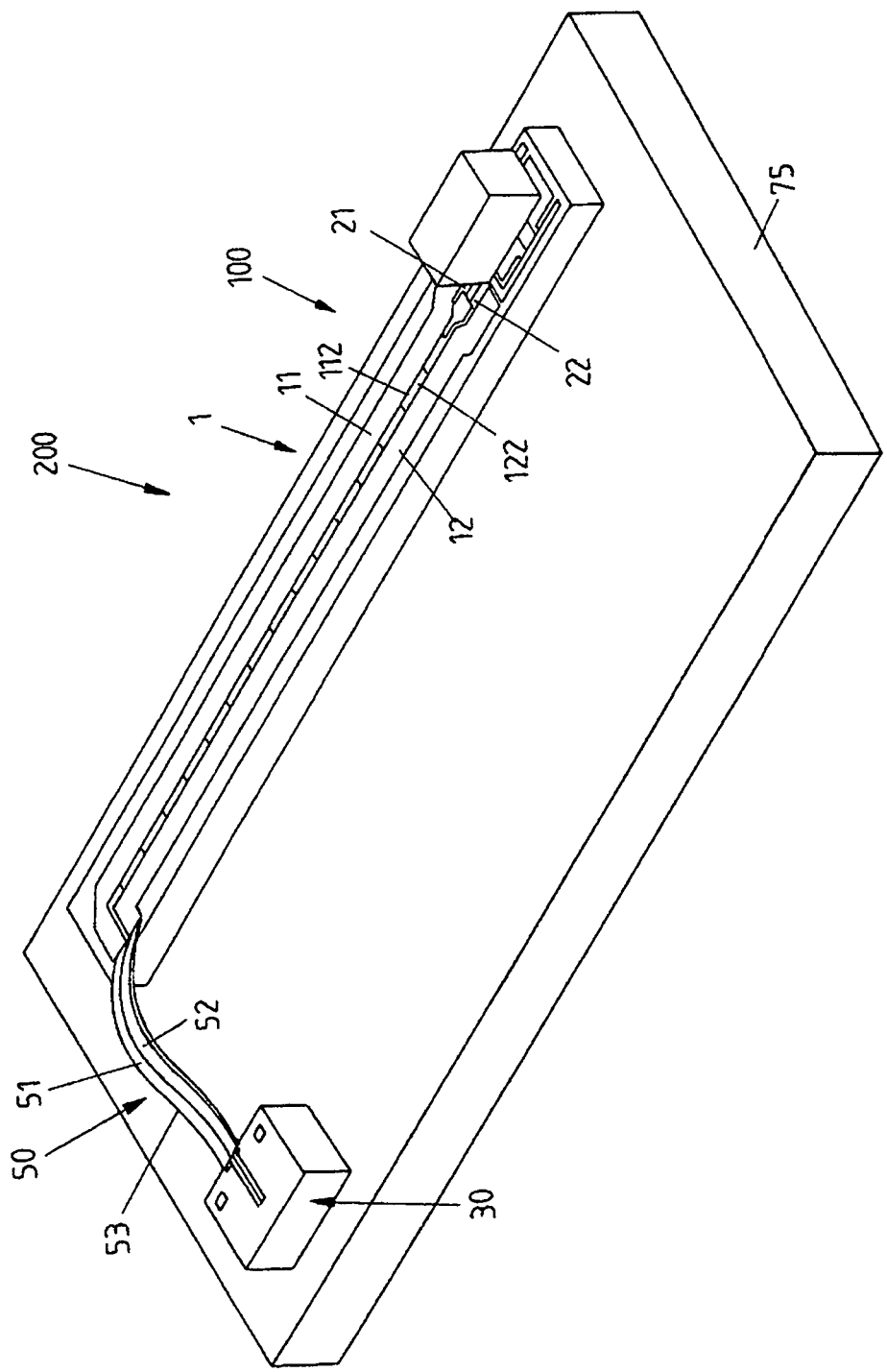
FIG. 1C relates to yet another alternative realization of the embodiment shown in FIG. 1A.

The electro-optical modulator device 200 according to the invention shown in FIG. 1A comprises an open-collector capable Mach-Zehnder-modulator 100. The modulator 100 comprises an electrode arrangement 1 having a first and a second electrical line 11, 12 forming a coplanar strip line. The electrical lines 11, 12 are connected to waveguide electrodes 113, 123 (see FIG. 8B) via air bridges for applying a voltage across optical waveguides 112, 122 of the modulator as in principle known from the prior art. The modulator 100 (including a semiconductor substrate 205 on which the electrode arrangement 1 is arranged) is disposed on a first substrate 70 (e.g. a ceramic substrate). The optical and electrical layout of modulator 100 may designed as described in the above-mentioned publication "45 GHz Bandwidth Travelling Wave Electrode Mach-Zehnder Modulator with Integrated Spot Size Converter", D. Hoffmann, Proceedings International Conference on Indium Phosphide and Related Materials, p. 585, 2004.

Besides the modulator 100 the electro-optical modulator device 200 further comprises a driver unit 30 configured to supply a (high frequency) differential voltage to the electrode arrangement 1 of modulator 100. The driver unit 30 is disposed on a second substrate 80 (e.g. a PCB) different from the first substrate 70 and arranged in a distance from the first substrate 70 such that a gap (of e.g. of at least 200 µm) is present between the two substrates 70, 80.

Further, the driver unit 30 (i.e. an output port of the driver unit 30 comprising two output contacts 506) is electrically connected to the first and the second electrical line 11, 12 via an electrical connection a flexible coplanar line 50. The flexible coplanar line 50 comprises electrical lines 51, 52 arranged at at least one flexible, foil-like substrate 61 (e.g. formed from a polymer such as polyimide), wherein a first end of the electrical lines 51, 52 is connected to the output contacts 506 and a second, opposite end is connected to the electrical lines 11, 12 of the modulator's electrode arrangement 1. Examples of the configuration of the flexible coplanar line 50 are described with reference to FIGS. 2A-2D.

FIG. 1B relates to an alternative realization of the modulator device according to the invention. The driver unit 30 in contrast to FIG. 1A is arranged on the second substrate 80 in flip chip configuration, i.e. its contacts (such as the output contacts 506) face downwards towards the substrate 80. The output contacts 506 are connected to an electrical coplanar strip line 90 arranged on the substrate 80, wherein one end of the flexible coplanar line 50 is connected to the electrical line 90 and an opposite end connects to the electrical lines 11, 12 of the modulator. In other words, the electrical connection between the driver unit 30 and the electrode arrangement 1 does not only comprise the flexible coplanar line 50 but also the electrical line 90, wherein a high frequency electrical mode may be continuously guided via the connecting coplanar strip lines 90 and 50 and the coplanar strip line formed by the electrical lines 11, 12 of the modulator 100.

It is noted that further electrical components (not shown) might be arranged on the second substrate 80 connected to the driver unit 30 via additional electrical lines (not shown) arranged on the substrate 80. According to another embodiment of the invention, the modulator 100 may be operated as a phase modulator, wherein only one of the optical waveguides 112, 122 is used to modulate the phase of an optical signal. For example, the one of the optical waveguides 112, 122 that is not used may be optically inactive, wherein, however, the capacitive segments 114 and 124 (see FIG. 8B), respectively, formed by the optically inactive waveguide are used as capacitive elements. Thus, the waveguide electrodes of the optically active waveguide are still capacitively coupled to the driver unit via the capacitive segments of the two waveguides.

According to the embodiment shown in FIG. 1C, the modulator 100 and the driver unit 30 are arranged on a common substrate 75.

The distance between the two (parallel) electrical lines 51, 52 is chosen to be small enough that the electrical lines 51, 52 from an electrical waveguide for conveying a high frequency electrical wave. For example, the distance between the electrical lines 51, 52 is smaller than 25 µm First endings of the electrical lines 51, 52 of the flexible coplanar line 50 are connected to an output port of the driver unit, whereas second endings of the electrical lines 51, 52 are connected to endings of the first and second electrical line 11, 12 of the modulator 100. Since the flexible coplanar strip 50 provides an electrical waveguide, its impedance can be better matched with the impedance of the driver unit 30 and the electrode arrangement 1 of the modulator such that the high frequency performance of the modulator can be improved. Due to its waveguide properties, in turn, the flexible coplanar strip 50 in contrast to bonding wires does not have to be very short such that a good thermal separation between the driver unit 30 (that may warm up during operation) and the modulator 100 can be realized. For example, the driver unit 30 is arranged in a distance of at least 1 mm from the modulator 100.

Figure 11:
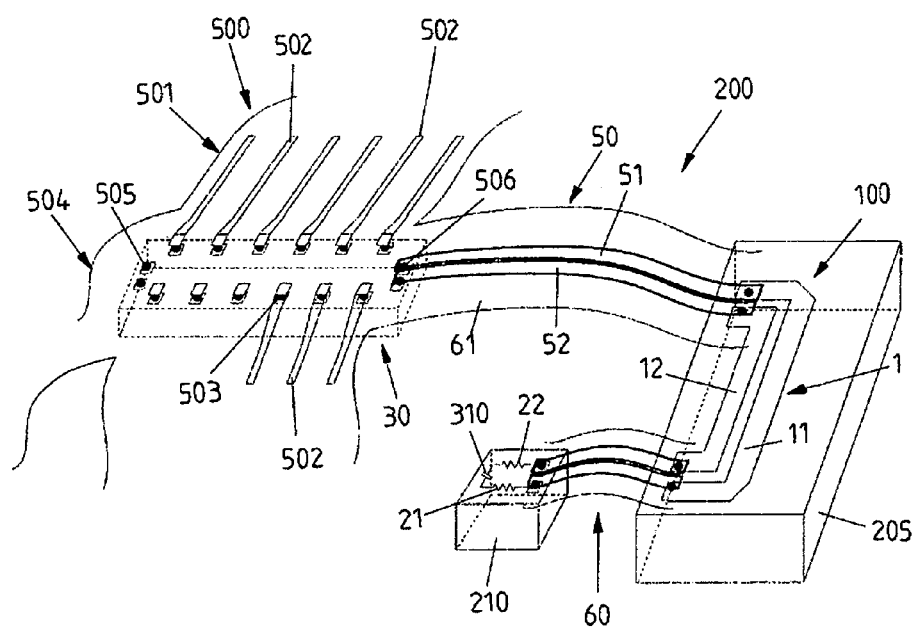
FIG. 11 shows a perspective view of a modulator device according to a further embodiment of the invention.

In order to terminate the coplanar strip line formed by the electrical lines 11, 12 of the modulator 100, two terminating resistors 21, 22 (each one having a resistance of e.g. 25Ω) are arranged between the electrical lines 11, 12, wherein the terminating resistors 21, 22 are formed as material layers (e.g. Ni—Cr layers) arranged on a substrate together with the coplanar strip line, i.e. the terminating resistors 21, 22 are monolithically integrated with other components of the electro-optic modulator. However, the terminating resistors 21, 22 may also be fabricated separately (e.g. on a different substrate) and connected to the electrical lines 11, 12 via another flexible coplanar strip line as shown in FIG. 11. Alternatively the terminating resistors 21, 22 may be conventionally bonded (e.g. via short bonding wires) to the electrical lines 11, 12. Examples of how the electrical lines 11, 12 may be terminated are shown in FIGS. 6 to 9.

FIGS. 2A-2D relate to embodiments of the flexible coplanar strip line 50. According to FIG. 2A, the electrical lines 51, 52 of the flexible coplanar strip line 50 are arranged on the same side of a first (e.g. flexible) electrically isolating layer 61 (e.g. a first polyimide layer) next to one another in the direction perpendicular to the longitudinal extension of the electrical lines 51, 52. A second isolating layer (e.g. a second polyimide layer) covers the first and the second electrical line 51, 52 such that they are embedded by the isolating layers 61, 62. For example, the thickness of each one of the isolating layers 61, 62 is less than 20 µm or less than 15 µm, e.g. about 10 µm, wherein the thickness of each one of the electrical lines 51, 52 (formed e.g. from a metal such as gold) is less than 10 µm or less than 8 µm (e.g. about 5 µm).

Figure 2A:
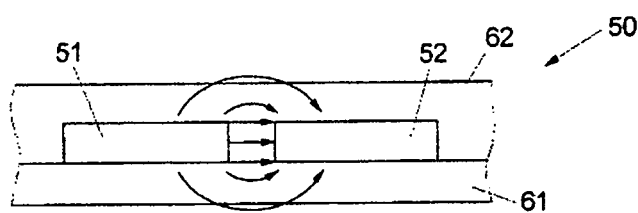

The flexible coplanar line 50 shown in FIG. 2A (and similar the flexible coplanar lines illustrated in FIGS. 2B-D) can be fabricated using thin film technology, wherein for example for fabricating the first isolating layer 61 a polymer material is applied to a carrier substrate, the electrical lines 51, 52 are deposited on the first isolating layer 61 and subsequently the second isolating layer 62 is applied. Finally, the carrier substrate is removed. It is noted that the isolating layers 61, 62 are not connected to one another by means of an adhesive, particularly to avoid that gases are set free from the adhesive. In particular, the isolating layers 61, 62 are formed from a standard isolating polymer used in solid state processes (such as liquid polyimides fabricated by e.g. the company "HD MicroSystems").

Figure 2B:
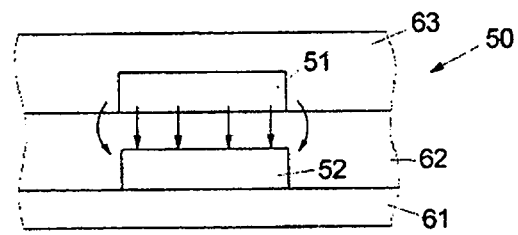

FIG. 2B is related to another variant, wherein the electrical lines 51, 52 are arranged one above the other in a direction perpendicular to the first isolating layer 61. Further, a second isolating layer 62 is arranged between the first and the second electrical line 51, 52 and a third isolating layer 63 covers the upper second electrical line 52 such that the electrical lines 51, 52 are embedded by the isolating layers 61-63.

According to FIG. 2C, again three isolating layers 61-63 are provided, wherein the first electrical line 51 and a first portion 521 of the second electrical line 52 are disposed on the first (lower) isolating layer 61. The second (middle) isolating layer 62 is arranged on the first electrical line 51 and the first portion 521 of the second electrical line 52, wherein a second portion 523 of the second electrical line 52 is arranged on top of the middle isolating layer 62. The first portion 521 and the second portion 523 are (e.g. integrally) connected to one another by a connecting portion 522 reaching trough a recess of the middle layer 62. The second portion 523 of the second electrical line 52 is covered by a third (upper) isolating layer 63.

The structure shown in FIG. 2C might be fabricated by arranging the middle layer 62 on the first electrical line 51 and the first portion 521 of the second electrical line 52. Subsequently, an opening is formed in the middle layer 62 and the connecting portion 522 is generated by depositing a metal (e.g. gold) in the region of the opening. Finally, the second portion 523 is generated to connect to the connecting portion 522.

According to the variant depicted in FIG. 2D, the flexible coplanar line 50 in addition to the electrical lines 51, 52 comprises two further electrical lines 53, 54, the further electrical lines 53, 54 being grounded (to realize a "ground-signal-signal-ground" configuration). The further lines 53, 54 may be arranged on the same side of the first isolating layer 61 as the first and the second electrical line 51, 52. Further, a second isolating layer 62 is arranged to cover the first and the second electrical line 51, 52 and the further electrical lines 53, 54.

Figure 3:
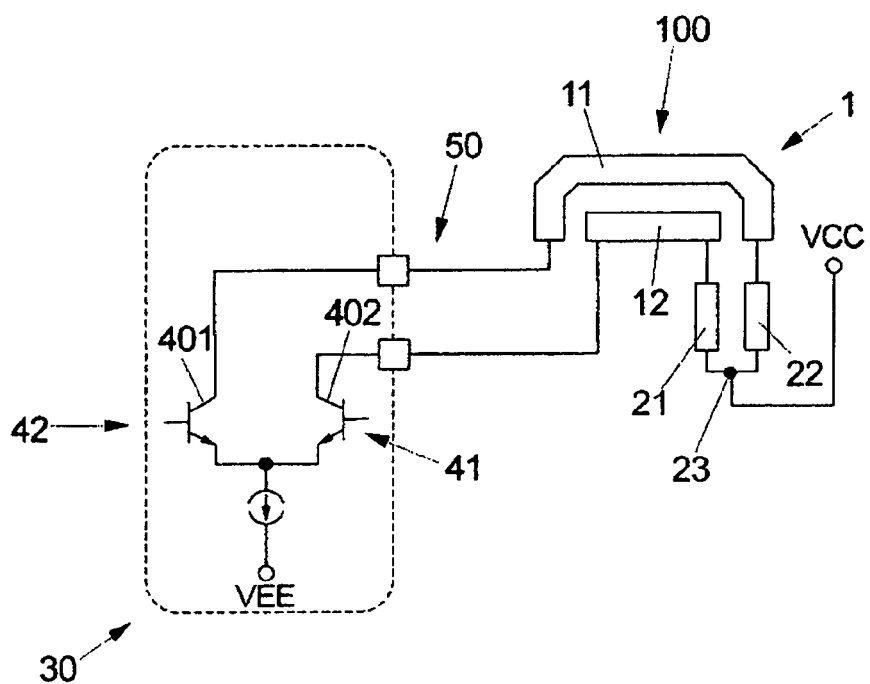
FIG. 3 shows a diagram of a first open collector circuit for operating an electro-optic modulator device according to the invention.

FIG. 3 illustrates a first example of an open collector circuit that may be used to drive the electrode arrangement 1 of modulator 100. The driver unit 30 supplies a differential voltage to the modulator's electrode arrangement 1 via the flexible coplanar strip line 50. Two terminating resistors 21, 22 are provided for terminating the coplanar strip line of the modulator 100, wherein the terminating resistors 21, 22 are connected to one another via an end contact 23. The end contact further connects to a supply voltage $V_{CC}$ fed towards the collectors 401, 402 of two transistors 41, 42 of the driver unit 30.

Figure 4:
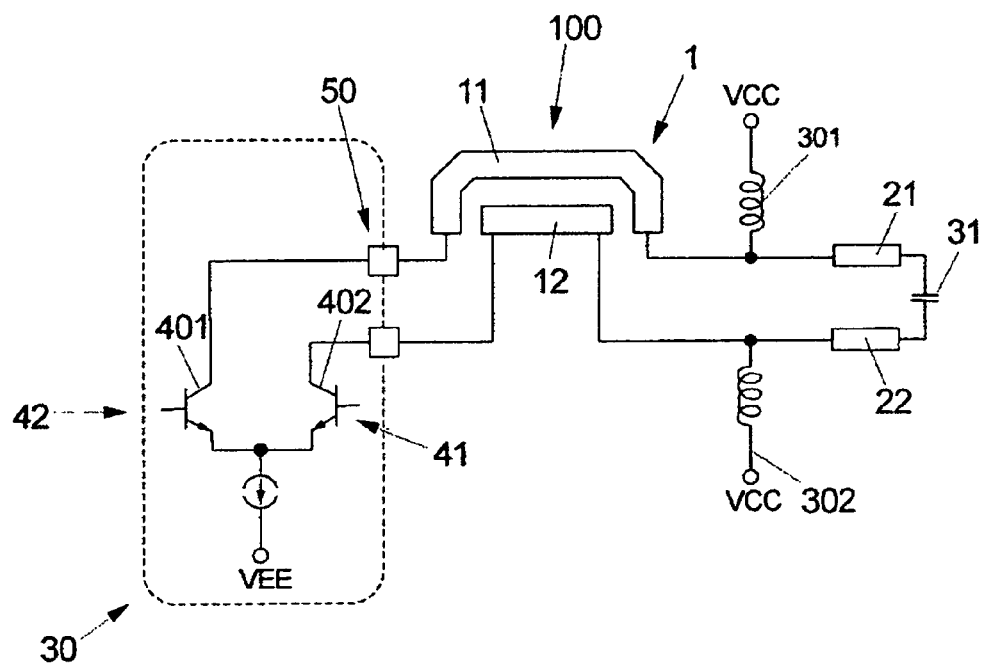
FIG. 4 shows a diagram of a second open collector circuit for operating an electro-optic modulator device according to the invention.
Figure 8A:
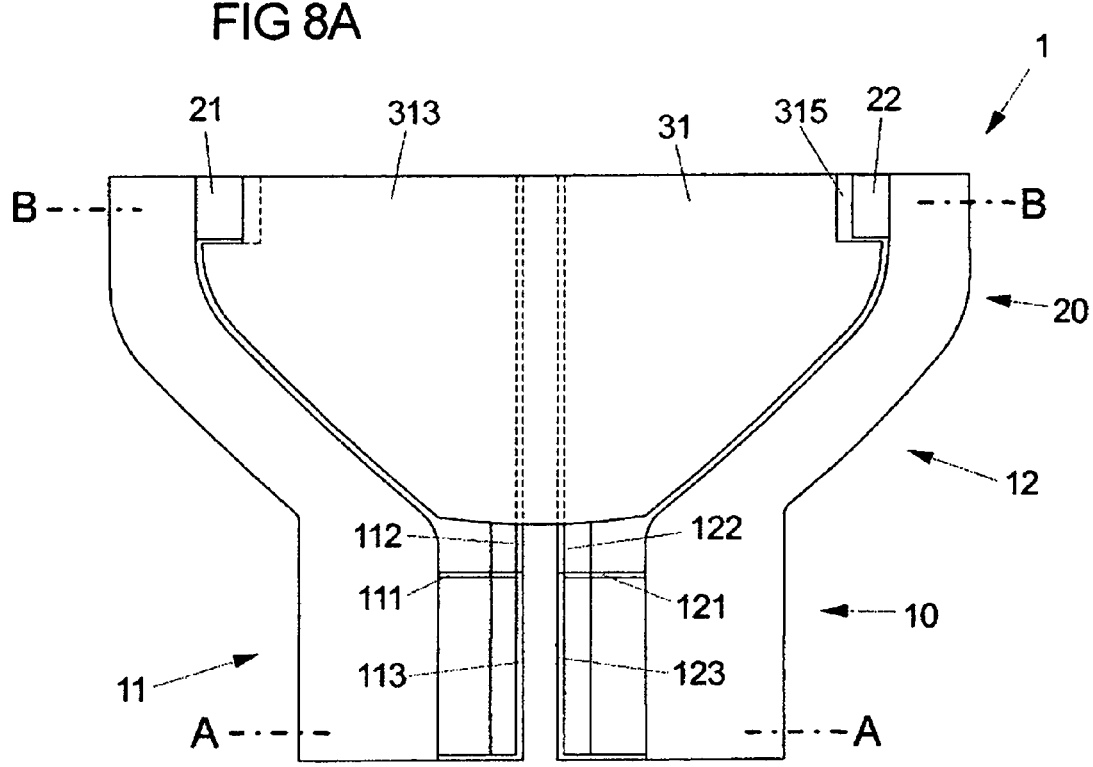
FIG. 8A shows a top view of a detail of an electro-optical modulator of a modulator device according to yet another embodiment of the invention.
Figure 8B:
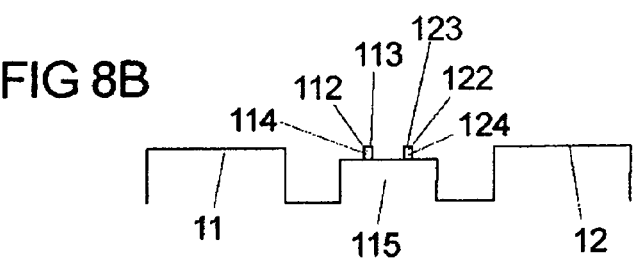
FIG. 8B shows a sectional view of the modulator shown in FIG. 8A along A-A.
Figure 8C:
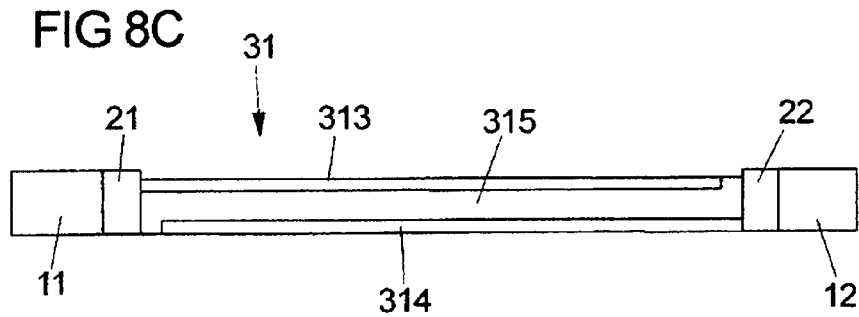
FIG. 8C shows a sectional view of the modulator shown in FIG. 8A through its capacitive structure (along line B-B in FIG. 8A).

A modification of the open collector circuit shows FIG. 4, wherein the terminating resistors 21, 22 are capacitively coupled to one another via a capacitor 31. A possible realization of the capacitor 31 is depicted in FIGS. 8A-8C. Further, two inductances 301, 302 are connected to the terminating resistors 21, 22 via which the supply voltage $V_{CC}$ is fed towards the collectors 401, 402 of the transistors 41, 42 of the driver unit 30. Supplying $V_{CC}$ via the inductances 301, 302 has the advantage that the supply power is guided around the terminating resistors 21, 22 such that a power loss in the terminating resistors 21, 22 is avoided. It is noted that the driver unit 30 may also be a CMOS device, wherein an open drain circuit may be realized (by supplying the voltage $V_{CC}$ to a drain of the driver unit's transistors). According to another embodiment, the inductances 301, 302 are arranged between the driver unit 30 and the modulator 100.

Figure 5:
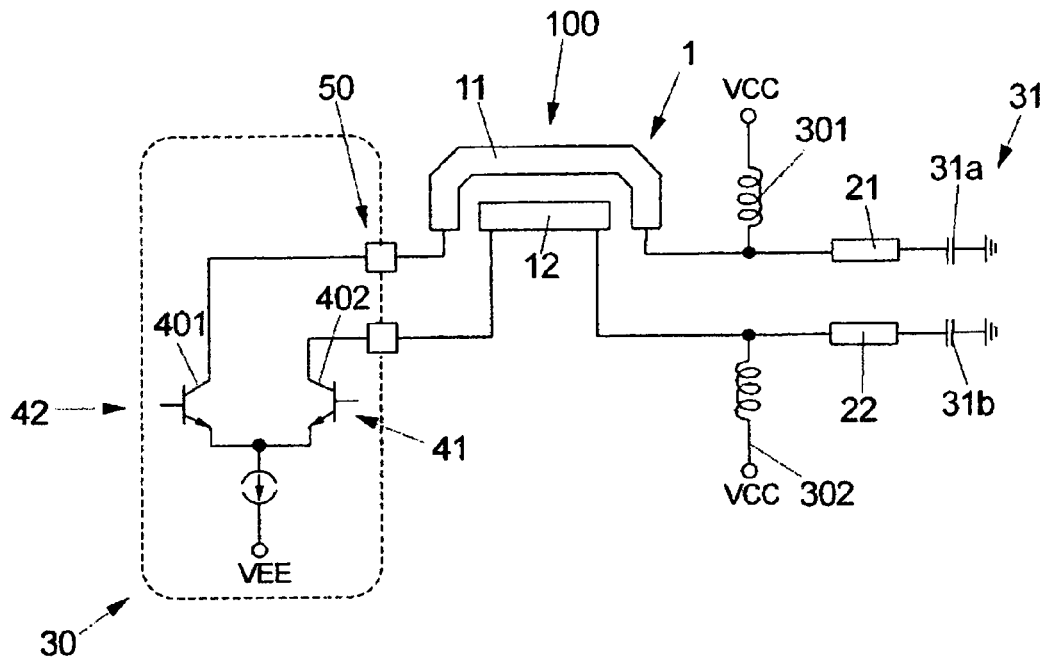
FIG. 5 shows a diagram of a third open collector circuit for operating an electro-optic modulator device according to the invention.
Figure 9:
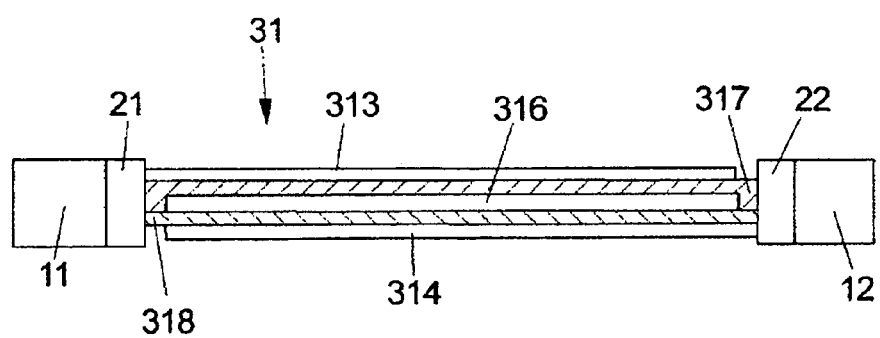
FIG. 9 shows a sectional view of another embodiment of the capacitive structure.

FIG. 5 relates to another open collector circuitry that may be used to operate the modulator 100, wherein the driver unit 30 again is connected to the electrical lines 11, 12 of the modulator's electrode arrangement via the flexible coplanar strip line 50. Furthermore, the termination of the modulator's coplanar strip line is realized by two terminating resistors 21, 22, each one of the terminating resistors 21, 22 being connected to ground via a capacitor 31a, 31b. An example of how the two capacitors 31a, 31b may be realized is illustrated in FIG. 9.

Figure 6:
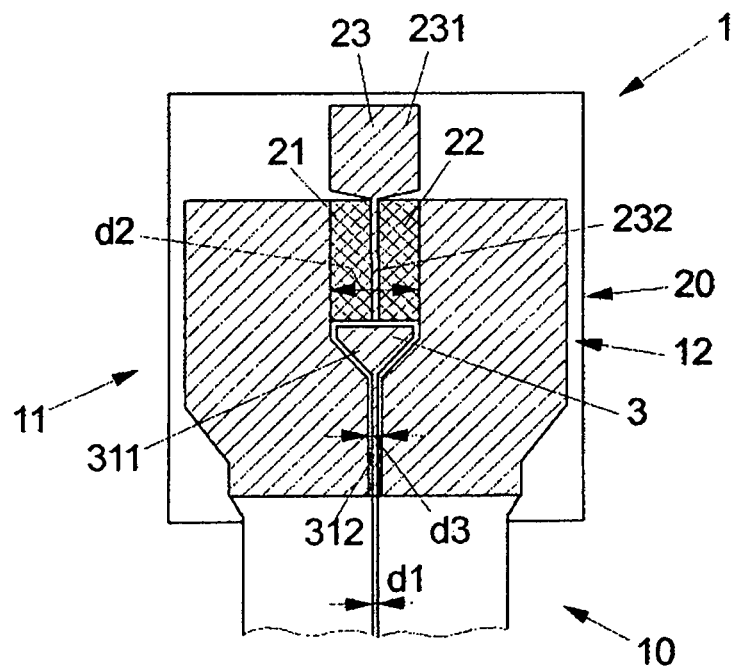
FIG. 6 depicts a variant of a terminating arrangement for terminating the electrode arrangement of a modulator.

FIG. 6 illustrates a possible realization of a terminating network used for the termination of the electrical lines 11, 12 of the electrode arrangement 1 of the modulator 100. The terminating network comprises two terminating resistors 21, 22 (each one having a resistance of e.g. 25Ω) arranged between the electrical lines 11, 12, wherein the terminating resistors 21, 22 are formed as material layers arranged on a substrate together with the coplanar strip line, i.e. the terminating resistors 21, 22 are monolithically integrated with other components of the electro-optic modulator. However, as mentioned above it is of course also possible that the terminating resistors 21, 22 are not monolithically integrated with the modulator. For example, the resistors 21, 22 are arranged on a different substrate and are bonded to the electrical lines 11, 12 of the modulator 100 (e.g. by means of bonding wires).

In order to permit the two terminating resistors 21, 22 to be arranged between the electrical lines 11, 12, the gap between the electrical lines 11, 12 widens towards the terminating resistors 21, 22 such that the electrode arrangement 1 comprises a first section 10 in which the electrical lines 11, 12 extend with a first distance $d_1$ from one another and a second region 20 in which the electrical lines 21, 22 extend with a second distance $d_2$ from one another, wherein the second distance $d_2$ is larger than the first distance $d_1$.

In the second region 20, an electrically conductive structure in the form of an additional metal layer 3 is arranged which compensates the influence of the larger gap between the electrical lines 11, 12 in the second region 20 on the impedance of the coplanar strip line. In particular, the metal layer 3 reduces the effective distance between the first and the second electrical line 11, 12, which determines the impedance of the coplanar strip-line, such that a deteriorating effect of the increased distance between the electrical lines 11, 12 in the region of the terminating resistors 21, 22 may be compensated.

In particular, the dimensions of the metal layer 3 are chosen in such a way that the impedance of the coplanar strip line formed by the electrical lines 11, 12 is adapted to the desired overall impedance of the coplanar line. In particular, the effective distance of the electrical lines 11, 12 from one another varies with the geometry of the metal layer 3 such that the metal layer 3 can be used to adapt the impedance of the coplanar strip line. In particular, instead of a single metal layer 3 a plurality of layers (comprising e.g. more than one metal layer) may be arranged.

More particularly, the metal layer 3 comprises a triangular base portion 311 integrally connected to a longitudinal protrusion 312. The triangular portion 311 extends within a lower subregion of the second region 20 (with distance $d_2$ between the electrical lines 11, 12) of the electrode arrangement 1, but also extends towards the first region 10, i.e. it extends within a region of the electrode arrangement 1 where the gap between the electrical lines 11, 12 decreases from distance $d_2$ towards a third distance $d_3$ that is smaller than $d_2$ and larger than $d_1$. The longitudinal portion 312 of the metal layer 3 extends in the region of the third distance $d_3$.

It is noted that the gap between the electrical lines 11, 12 in the first and/or the second region 10, 20 of the electrode arrangement 1 does not necessarily have to be constant. It is further noted that the shape of the gap between the electrical lines 11, 12 shown in FIG. 1 is of course only exemplary. Accordingly, other shapes of the metal layer 3 are conceivable, e.g. having a rectangular, round and/or a sine shaped base portion 311. Further, the longitudinal portion 312 of the metal layer 3 may be shorter or may even be omitted.

Moreover, the terminating resistors 21, 22 are connected to one another via an end contact 23 (in particular formed by a metal layer) that may be used to realize the open collector circuit shown in FIG. 3. That is, the end contact 23 can be used to connect the supply voltage $V_{CC}$ to the electrical lines 11, 12 and thus to feed the supply voltage $V_{CC}$ to the driver unit. More particularly, the end contact 23 has a (rectangular) base portion 231 from which a longitudinal portion 232 extends towards the base portion 311 of the metal layer 3, wherein the terminating resistors 21, 22 are connected to one another via the longitudinal portion 232.

When supplying a differential voltage to the modulator's electrode arrangement 1, i.e. if the electrical lines 11, 12 are driven symmetrically, the longitudinal portion 232 may be connected to the triangular base portion 311 of the metal layer 3 such that the metal layer 3 could be connected to a DC potential together with the terminating resistors 21, 22. It is noted that the metal layer 3 may assume different DC potentials, wherein, however, its potential does not vary with a symmetric alternating voltage applied to the coplanar strip line, i.e. the metal layer 3 is arranged as a "floating" structure.

However, the metal layer 3 could also be electrically (galvanically) isolated from the electrical lines 11, 12 and the terminating resistors 21, 22. In particular, the electrical isolation of the metal layer 3 may be realized by a gap between the metal layer 3 and the surrounding portions of the electrical lines 11, 12 and the terminating resistors 21, 22.

Figure 7:
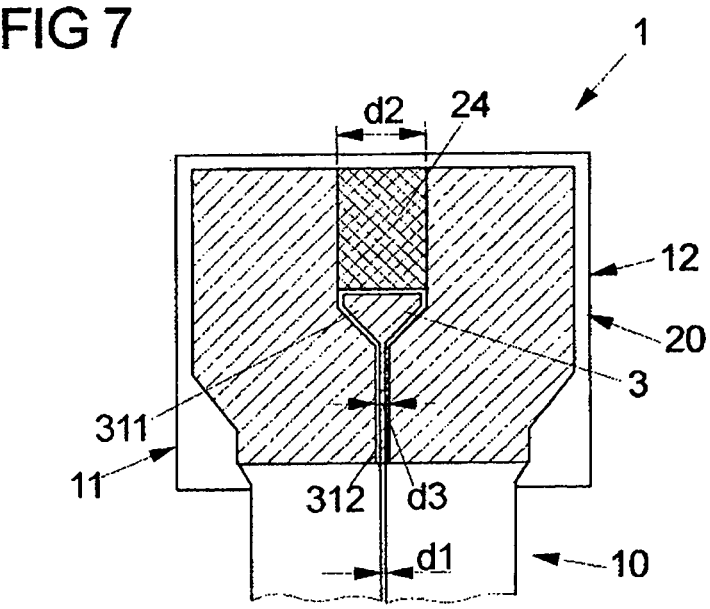
FIG. 7 depicts another variant of a terminating arrangement for terminating the electrode arrangement of a modulator.

The two terminating resistors 21, 22 might be replaced by a single terminating resistor 24 as shown in FIG. 7. The single terminating resistor 24 is arranged in the second region 20 of the electrode arrangement 1 similarly to the two terminating resistors 21, 22 in FIG. 6. Also, a metal layer 3 is arranged in the second region 20 of the electrode arrangement 1 for adapting the overall impedance of the electrode arrangement 1. Further, the metal layer 3 may be galvanically isolated from the electrical lines 11, 12 and the terminating resistor 24.

Further, instead of the additional metal layer 3 a capacitive structure in the form of a metal structure 31 may be arranged in the second region 20 of the electrode arrangement 1 between the electrical lines 11, 12 (connected to waveguide electrodes 113, 123 via air bridges 111, 121 for applying a voltage across optical waveguides 112, 122) as shown in FIGS. 8A-8C. The metal structure 31 forms a capacitive structure that galvanically separates the two terminating resistors 21, 22 and thus may be used to realize to open collector circuit illustrated in FIG. 4.

More particularly, according to a first variant, the metal structure 31 comprises two metal layers 313, 314 arranged one above the other (see FIG. 8C), wherein the metal layers 313, 314 (e.g. gold layers) are separated by a dielectric layer 315 (e.g. a silicon nitride or a silicon oxide layer) arranged between them. The upper metal layer 313 is electrically connected to the first terminating resistor 21, wherein the lower metal layer 314 is electrically connected to the second terminating resistor 22. Thus, the metal structure 31 provides a capacitor coupling the two terminating resistors 21, 22. In particular, the capacitive coupling between the two terminating resistors 21, 22 provided by the metal structure 31 can be used to realize an open collector circuit shown in FIG. 4.

Further, the metal structure 31 may be configured in such a way that the influence of the larger distance between the electrical lines 11, 12 in the second region 20 on the impedance of the coplanar strip line is compensated as set forth above with respect to the metal layer 3 used in the embodiments of FIGS. 6 and 7.

FIG. 8B also illustrates that the first optical waveguide 112 comprises a plurality of first capacitive segments 114 and the second optical waveguide 122 comprises a plurality of second capacitive segments 124. The first and the second waveguide electrodes 113, 123 are arranged on top of the first and second capacitive segments 114, 124, respectively, such that the first and the second waveguide electrodes 113, 123 and thus the first and second electrical lines 11, 12 are capacitively coupled to one another. The capacitive segments 114, 124 may be formed by p-i-n diode sections of the optical waveguides 112, 122. An active layer (for example, a multi quantum well layer) forms the intrinsic region, a p-doped region above the intrinsic region the p-region and an n-doped layer below the active layer and arranged on a semi-isolating substrate (e.g. an InP-substrate) the n-region of the diodes.

Further, the capacitive segments 114, 124 may be coupled in series via an n-doped region 115 formed by a portion of an n-doped layer such that the first and the second waveguide electrodes 113, 123 are capacitively coupled to one another, the modulator 1 thus having a capacitively coupled coplanar travelling wave electrode design as described above.

FIG. 9 illustrates a second variant of the metal structure 31 (in a sectional view along line B-B in FIG. 8A), the metal structure according to this variant having three metal layers 313, 314 and 316. The first metal layer 313 is galvanically isolated from the third (middle) metal layer 316 by a first dielectric layer 317 and the second metal layer 314 is galvanically isolated from the third metal layer 316 by a second dielectric layer 318, thereby forming a first and a second capacitor. Instead of the two dielectric layers 317, 318 a single dielectric layer embedding the middle metal layer 316 could be arranged.

The middle metal layer 316 will be grounded, wherein the first, upper metal layer 313 is connected to the first terminating resistor 21 and the second, lower metal layer 314 is connected to the second terminating resistor 22 to realize the open collector circuitry shown in FIG. 5. That is, the termination of the coplanar strip line of the modulator is not realized by a single capacitor, but by two capacitors, wherein each one of the terminating resistors 21, 22 is connected to ground via one of the capacitors.

Figure 10:
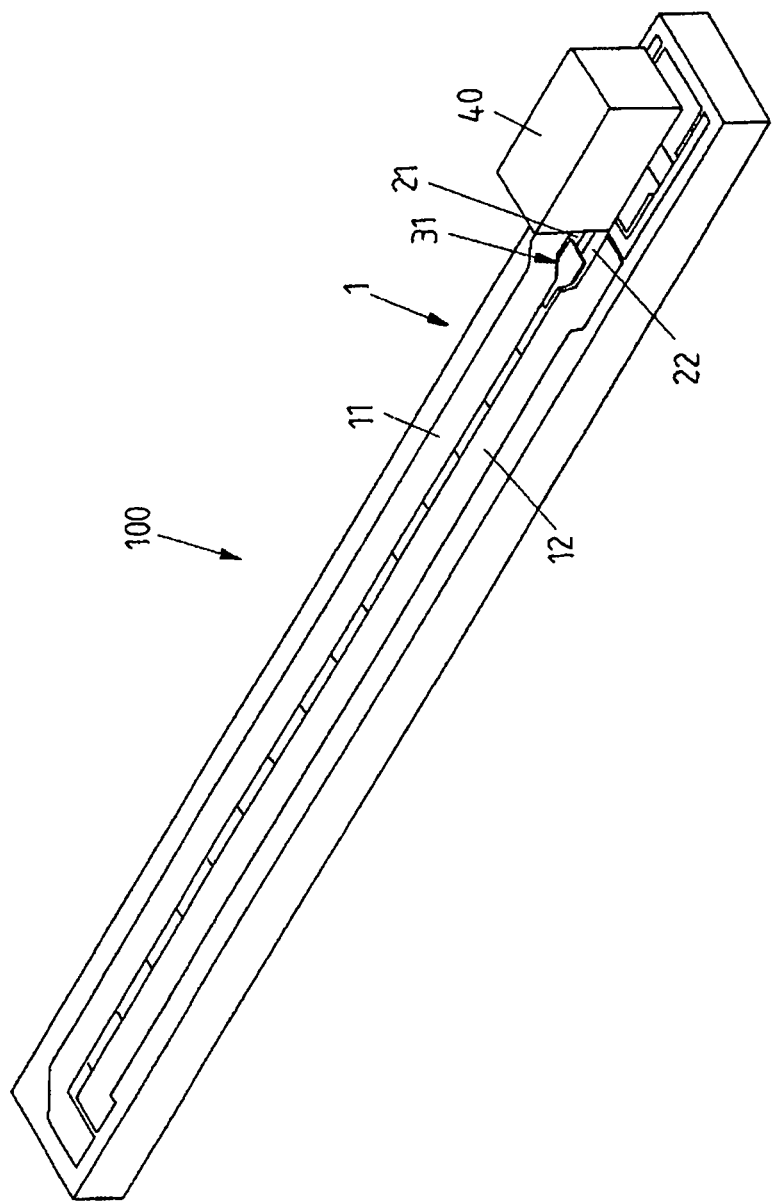
FIG. 10 illustrates the modulator device of FIG. 1 without the driver unit.

FIG. 10 shows a perspective view of the complete Mach-Zehnder-modulator 100 of FIG. 1 without the driver unit. The modulator comprises a metal structure 31 according to FIGS. 8A-C arranged between the electrical lines 11, 12 in a widened portion of the electrode arrangement 1 and capacitively coupling two terminating resistors 21, 22 to one another. However, of course also the terminating network shown in FIG. 7 (single terminating resistor) or FIG. 9 could be employed in modulator 100.

In addition to the capacitor formed by the metal structure 31 at least one further (optional) capacitor 40 is arranged. The capacitor 40 has a capacitance that is larger than the capacitance provided by the metal structure 31 such that the terminating resistors 21, 22 may be capacitively coupled also with respect to lower frequencies. For example, the further capacitor 40 allows frequencies below 1 GHz to pass, while frequencies above 1 GHz will pass via the capacitor formed by the metal structure 31.

FIG. 11 illustrates another embodiment of the modulator device 200. Similar to FIG. 1, the driver unit 30 (i.e. its output contacts 506) is connected to first endings of the first and second electrical line 11, 12 of the modulator's electrode arrangement 1 via a first flexible coplanar line 50. Further, two terminating resistors 21, 22 are provided that are arranged on a substrate 210 separate from a substrate 205 on which the electrical lines 11, 12 of the modulator 100 are disposed. The terminating resistors 21, 22 are connected to second endings of the first and second electrical line 11, 12 via a second flexible coplanar line 60. Further, the terminating resistors 21, 22 are connected to one another via a capacitor 310.

The first flexible line 50 of this embodiment is a part of larger flexible contact structure 500. The contact structure 500 comprises a central section 501 integrally connected to the first flexible coplanar line 50. The central section 501 comprises a plurality of conducting lines 502 for connecting external devices (such as a DC voltage controller) to input contacts 503 of an integrated circuit that forms the driver unit 30. Besides the central section 501 the contact structure 500 comprises an (integrally connected) input section 504 for supplying an RF voltage to RF input contacts 505 of the driver unit IC 30. For example, the input section 504 similarly to the first flexible coplanar line 50 forms a coplanar line, i.e. a waveguide for conveying an RF wave to the input contacts 505.

The driver unit IC 30 is connected to the central section 501 in flip-chip orientation, i.e. its backside faces away from the central section 501 and may be disposed on a heat conducting material (not shown). That is, the driver unit IC 30 is connected in flip-chip orientation to the first flexible line 50 and the conducting lines 502 of the flexible contact structure 500. Subsequently, the arrangement of the driver unit IC 30 and the flexible contact structure 500 turned around and connected in this turned around (flipped over) orientation to the electrical lines 11, 12 of the modulator 100. Thus, the electrical lines 51, 52 are located on a lower side of the isolating layer 61 of the flexible line 50 (i.e. on a side that faces towards the electrode arrangement 1 of the modulator 100).

Figure 12:
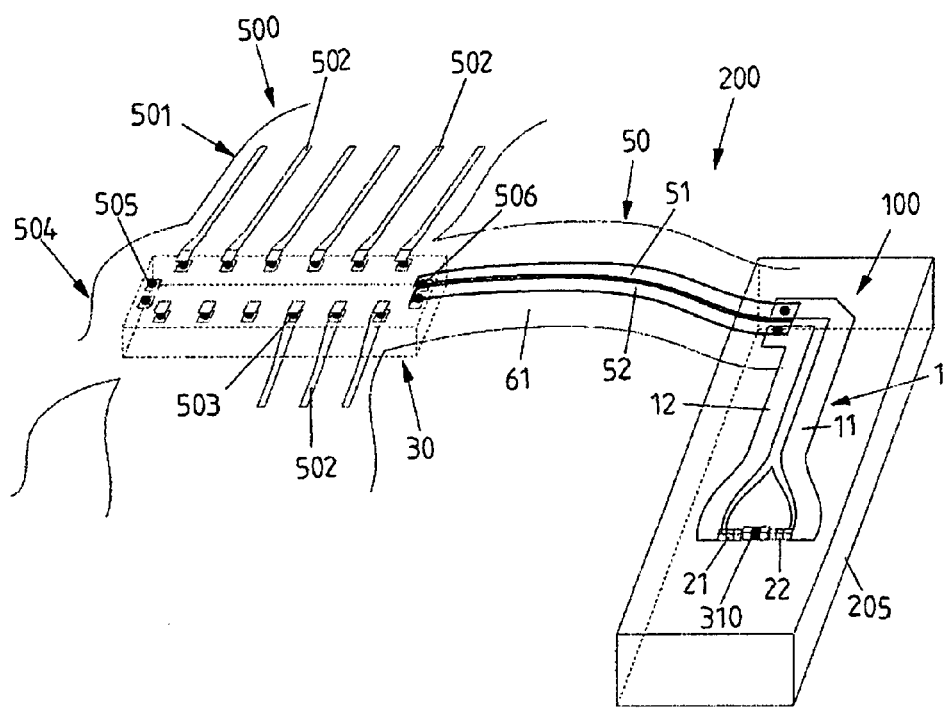
FIG. 12 illustrates a perspective view of a modulator device according to yet another embodiment of the invention.

As shown in FIG. 12, the terminating resistors 21, 22 may also be integrated with the modulator 100, i.e. they may be arranged on the same substrate 205 as the first and the second electrical line 11, 12 of the electrode arrangement 1. Further, the capacitor 310 that galvanically separates the first and the second terminating resistor 21, 22 may be formed by the capacitive metal structure 31 shown in FIGS. 8A-C. The terminating resistors 21, 22 and the capacitor 310 are arranged in a widened section of the modulator 100 in which distance between the first and the second electrical line 11, 12 of the electrode arrangement 1 is greater than outside the widened section.

Figure 13:
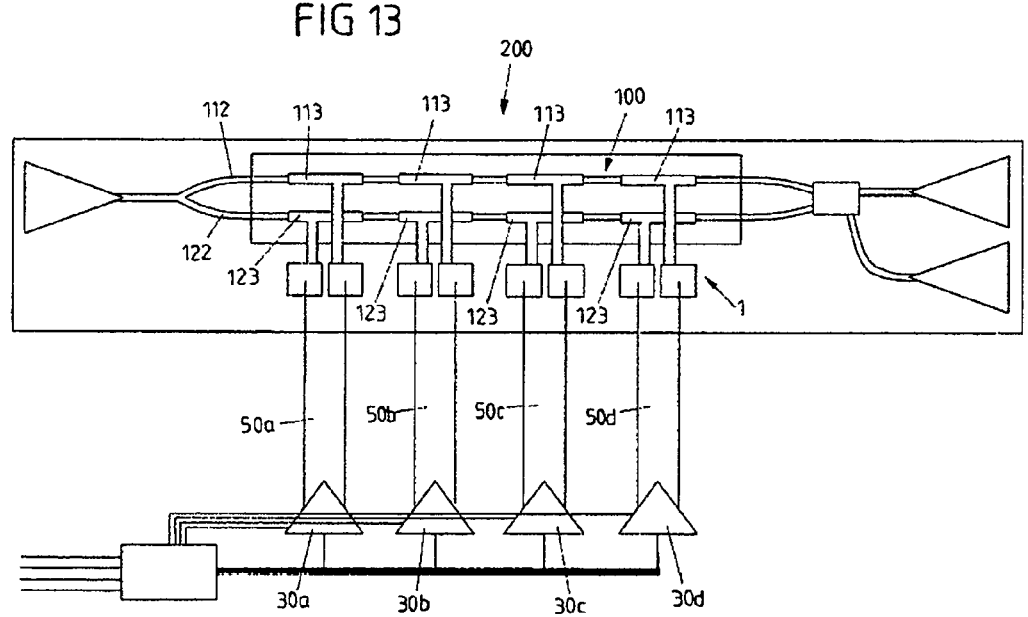
FIG. 13 depicts a schematical view of a multiple driver unit embodiment of modulator device according to an embodiment of the invention.

FIG. 13 schematically illustrates another embodiment of the invention, wherein the modulator 100 of the modulator device 200 is not configured as a travelling wave modulator. Rather, the modulator device 200 comprises a plurality of driver units 30a-30d, each of them being assigned to one of the first waveguide electrodes 113 and one of the second waveguide electrodes 123. The optical waveguides 112, 122 may be comprise capacitive segments 114, 124 as set forth above with respect to FIG. 8B for capacitively coupling the waveguide electrodes 113, 123. More particularly, each one of the driver units 30a-30d is connected to one of the first waveguide electrodes 113 and one of the second waveguide electrodes 123 via a flexible coplanar strip line 50a-50d. Each one of the flexible coplanar strip line 50a-50d may be configured as shown in FIGS. 2A-2D.

The modulator device 200 shown in FIG. 13 may realize an arrangement described in the above-mentioned publication "10 Gb/s-80-km operation of full C-band InP MZ modulator with linear-accelerator-type tiny in-line centipede electrode structure directly driven by logic IC of 90-nm CMOS process", T. Kato et al., Optical Fiber Communication Conference and Exposition, 2011, p. 1.

According to another embodiment of the invention, the modulator device 200 may also be operated as a phase modulator, wherein only one of the optical waveguides 112, 122 is used to modulate the phase of an optical signal. For example, the one of the optical waveguides 112, 122 that is not used may be optically inactive, wherein, however, the capacitive segments 114 and 124, respectively, formed by the optically inactive waveguide are used as capacitive elements. Thus, the waveguide electrodes of the optically active waveguide are still capacitively coupled to the driver units 30a-30d via the capacitive segments of the two waveguides.

FIG. 14 shows an alternative configuration of the modulator device 200 shown FIG. 13. The driver units 30a-30d are flip-chip bonded on a (second) substrate 80 (similar to the driver unit 30 shown in FIG. 1B), wherein the driver units 30a-30d may be realized by a common, single IC. Each one of the driver units 30a-30d comprises output contacts connected to coplanar strip lines 90a-90d arranged on the substrate 80. The electrical lines 90a-90d, in turn, are connected to first ends of flexible coplanar strip lines 50a-50d.

An opposite end of the flexible coplanar strip lines 50a-50d is connected to electrical lines 11, 12 of the modulator's electrode arrangement 1, wherein the electrical lines 11, 12 in contrast to FIGS. 1A-1C are line segments assigned to one of the waveguide electrode pairs (that each comprises a first waveguide electrode 113 and an opposite second waveguide electrode 123).

REFERENCE SIGNS 1 electrode arrangement
3 metal layer
10 first region
11, 12 electrical line
20 second region
21, 22 terminating resistor
23 end contact
24 single terminating resistor
30, 30a, 30b, 30c, 30d driver unit
31 metal structure
31a, 31b, 310 capacitor
40 further capacitor
41, 42 transistor
50, 50a, 50b, 50c, 50d flexible coplanar strip line
51, 52 electrical line
60 second coplanar strip line
61 first isolating layer
62 second isolating layer
63 third isolating layer
70 first substrate
75 common substrate
80 second substrate
90, 90a, 90b, 90c, 90d electrical line
100 modulator
111, 121 air bridge
112, 122 optical waveguide
113, 123 waveguide electrode
114, 124 capacitive segments
115 n-doped region
200 modulator device
205 semiconductor substrate
311 base portion
312 longitudinal portion
313, 314, 316 metal layer
317, 318 dielectric layer
401, 402 collector
500 contact structure
501 central section
502 conductive line
503 input contact
504 input section
505 input contact
506 output contact
521 first portion second electrical line
522 second portion second electrical line
523 connecting portion

The invention claimed is:

1. An electro-optical modulator device, comprising
at least one electro-optical modulator having a first and a second optical waveguide and an electrode arrangement for applying a voltage across the optical waveguide,
wherein the electrode arrangement comprises a plurality of first waveguide electrodes and a plurality of second waveguide electrodes arranged on top of the first and the second optical waveguide, respectively,
wherein the first and second waveguide electrodes are capacitively coupled to one another; and
at least one driver unit for supplying a voltage to the electrode arrangement; and
an electrical connection between the driver unit and the electrode arrangement;
wherein the electrode arrangement comprises a first electrical line connected to the first waveguide electrodes and a second electrical line connected to the second waveguide electrodes, the first and the second electrical line forming a coplanar strip line,
wherein the electrical connection between the driver unit and the electrode arrangement comprises a flexible coplanar strip line,
wherein the flexible coplanar strip line is part of a flexible contact structure that comprises a plurality of conducting lines for connecting external devices to input contacts of the driver unit,
wherein the flexible coplanar strip line comprises at least two electrical lines,
wherein a first one of the electrical lines of the flexible coplanar strip line is connected to the first electrical line of the electrode arrangement and a second one of the electrical lines of the flexible coplanar strip line is connected to the second electrical line of the electrode arrangement, and
wherein the driver unit is configured for supplying a differential voltage signal to the coplanar strip line formed by the first and the second electrical line of the electrode arrangement via the first and the second electrical line of the flexible coplanar strip line.

2. The modulator device as claimed in claim 1, wherein the two electrical lines of the flexible coplanar strip line are arranged in and/or on at least one electrically isolating layer.

3. The modulator device as claimed in claim 1, wherein the flexible coplanar strip line comprises exactly two electrical lines.

4. The modulator device as claimed in claim 1, wherein the electrical lines of the flexible coplanar strip line are bonded to the first and the second electrical line of the electrode arrangement, respectively.

5. The modulator device as claimed in claim 1, wherein the distance between the first and the second electrical line of the flexible coplanar strip line is less than 25 µm.

6. The modulator device as claimed in claim 1, wherein the first and the second electrical line of the flexible coplanar strip line are arranged at least partially adjacent to one another in a direction perpendicular to their longitudinal extension.

7. The modulator device as claimed in claim 1, wherein the first and the second electrical line of the flexible coplanar strip line are arranged at least partially above one another in a direction perpendicular to the at least one isolating layer.

8. The modulator device as claimed in claim 1, wherein the first and/or the second line is arranged on a first isolating layer and covered by a second isolating layer.

9. The modulator device as claimed in claim 6, wherein the second electrical line comprises a first portion arranged on a first isolating layer and a second portion arranged on a second isolating layer extending between the first and the second portion.

10. The modulator device as claimed in claim 1, wherein the electrode arrangement is disposed on a first substrate and the driver unit is disposed on second substrate, wherein the first substrate is arranged in a distance from the second substrate.

11. The modulator device as claimed in claim 1, wherein none of the electrical lines of the electrode arrangement and/or of the flexible coplanar strip line is grounded.

12. The modulator device as claimed in claim 1, wherein the driver unit is configured for supplying a first varying signal to the first electrical line of the electrode arrangement via the first electrical line of the flexible coplanar strip line and a second varying signal to the second electrical line of the electrode arrangement via the second electrical line of the flexible coplanar strip line.

13. The modulator device as claimed in claim 1, wherein the first and the second electrical line of the flexible coplanar strip line are formed at least partially as geometrically symmetric structures.

14. The modulator device as claimed in claim 1, wherein the first and the second electrical line of the flexible coplanar strip line are formed as longitudinal structures which at least essentially extend parallel to one another.

15. The modulator device as claimed in claim 1, wherein the first and the second electrical line of the flexible coplanar strip line form an electrical waveguide for conveying a high frequency mode from the driver unit to the modulator impedance matched to the first and the second electrical line of the electrode arrangement such that an electrical mode is continuously guided via the flexible coplanar strip line and the electrode arrangement.

16. An electro-optical modulator device, comprising
at least one electro-optical modulator having a first and a second optical waveguide and an electrode arrangement for applying a voltage across the optical waveguide,
wherein the electrode arrangement comprises a plurality of first waveguide electrodes and a plurality of second waveguide electrodes arranged on top of the first and the second optical waveguide, respectively,
wherein the first and second waveguide electrodes are capacitively coupled to one another;
an electrical connection between a plurality of driver units and the electrode arrangement;
wherein each one of the driver units is connected to one of the first waveguide electrodes and to one of the second waveguide electrodes via an electrical connection that comprises a flexible coplanar strip line,
wherein the flexible coplanar strip line is part of a flexible contact structure that comprises a plurality of conducting lines for connecting external devices to input contacts of the driver unit.

17. An electro-optical modulator device, comprising
at least one electro-optical phase modulator having at least one active optical waveguide and an electrode arrangement for applying a voltage across the active optical waveguide,
wherein the electrode arrangement comprises a plurality of waveguide electrodes arranged on top of capacitive segments formed by the optical waveguide;
at least one optically inactive capacitive element;
at least one driver unit for supplying a voltage to the electrode arrangement;
an electrical connection between the at least one driver unit driver unit and the electrode arrangement, wherein the waveguide electrodes are capacitively coupled to the at least one driver unit via the capacitive segments and the at least one capacitive element and the electrical connection,
wherein the electrical connection between the at least one driver unit and the electrode arrangement comprises a flexible coplanar strip line.

* * * * *

UNITED STATES PATENT AND TRADEMARK OFFICE
CERTIFICATE OF CORRECTION

PATENT NO. : 9,835,927 B2
APPLICATION NO. : 15/039404
DATED : December 5, 2017
INVENTOR(S) : Karl-Otto Velthaus et al.

It is certified that error appears in the above-identified patent and that said Letters Patent is hereby corrected as shown below:

On the Title Page

In Column 1, in Item (30), delete "November 25, 2014" and insert -- November 25, 2013 --, therefor.

Signed and Sealed this
First Day of May, 2018

Andrei Iancu
*Director of the United States Patent and Trademark Office*